United States Patent
Meyering et al.

(10) Patent No.: US 6,280,791 B1
(45) Date of Patent: *Aug. 28, 2001

(54) PROCESS OF MAKING A THREE-REGION REINFORCED MICROPOROUS FILTRATION MEMBRANE

(75) Inventors: Mark T Meyering, Middlefield; Jack H. Vining, Jr., Coventry; Thomas Badenhop, Westport, all of CT (US)

(73) Assignee: Cuno, Inc., Meriden, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/706,125

(22) Filed: Nov. 3, 2000

Related U.S. Application Data

(62) Division of application No. 09/035,388, filed on Mar. 5, 1998, now abandoned.
(60) Provisional application No. 60/043,181, filed on Apr. 11, 1997.

(51) Int. Cl.$^7$ ............... B05D 1/26; B05D 1/34; B05D 1/36; B05D 3/00; B05D 7/04
(52) U.S. Cl. ............... 427/244; 427/245; 427/246; 427/412; 210/490
(58) Field of Search ............... 427/152, 179, 427/210, 245, 246, 244, 412, 420, 336; 210/490

(56) References Cited

U.S. PATENT DOCUMENTS

| | | |
|---|---|---|
| 1,792,414 | 2/1931 | Cole . |
| 3,639,146 | 2/1972 | Andra et al. . |
| 3,876,738 | 4/1975 | Marinaccio et al. . |
| 3,912,834 | 10/1975 | Imai et al. . |
| 3,968,292 | 7/1976 | Pearman et al. . |
| 3,969,548 | 7/1976 | Hunter et al. . |
| 4,086,377 | 4/1978 | Barchi . |
| 4,156,038 | 5/1979 | Fock et al. . |
| 4,340,479 | 7/1982 | Pall . |
| 4,340,480 | 7/1982 | Pall et al. . |
| 4,341,832 | 7/1982 | Barnett et al. . |
| 4,473,474 | 9/1984 | Ostreicher et al. . |
| 4,473,475 | 9/1984 | Barnes, Jr. et al. . |
| 4,621,678 | 11/1986 | Hahn et al. . |
| 4,645,602 | 2/1987 | Barnes, Jr. et al. . |
| 4,707,265 | 11/1987 | Barnes, Jr. et al. . |
| 4,707,266 | 11/1987 | Degen et al. . |
| 4,728,541 | 3/1988 | Voswinckel . |
| 4,770,777 | 9/1988 | Steadly et al. . |
| 4,837,070 | 6/1989 | Weber et al. . |
| 4,844,805 | 7/1989 | Solomon . |
| 4,894,157 | 1/1990 | Johnson . |
| 4,900,449 | 2/1990 | Kraus et al. . |
| 4,944,820 | 7/1990 | McCarten . |
| 4,976,901 | 12/1990 | Beck et al. . |
| 4,997,703 | 3/1991 | Gehrig . |
| 5,006,247 | 4/1991 | Dennison et al. . |
| 5,215,662 | 6/1993 | Johnson et al. . |
| 5,250,320 | 10/1993 | Suzuki et al. . |
| 5,250,404 | 10/1993 | Sakakibara . |
| 5,376,273 | 12/1994 | Pacheco et al. . |
| 5,433,859 | 7/1995 | Degen . |
| 5,444,097 | 8/1995 | Tkacik . |
| 5,458,782 | 10/1995 | Hou et al. . |
| 5,489,406 | 2/1996 | Beck et al. . |
| 5,500,167 | 3/1996 | Degen . |
| 5,523,118 | 6/1996 | Williams . |
| 5,525,376 | 6/1996 | Leonard . |
| 5,533,675 | 7/1996 | Benecke et al. . |
| 5,538,754 | 7/1996 | Sandock . |
| 5,614,095 | 3/1997 | Degen . |
| 5,654,031 | 8/1997 | Delmore et al. . |
| 5,736,051 | 4/1998 | Degen et al. . |
| 5,876,500 | 3/1999 | Kurimoto . |
| 5,888,434 | 3/1999 | Mahoney et al. . |
| 6,056,529 | 5/2000 | Meyering et al. . |
| 6,090,441 | 7/2000 | Vining, Jr. et al. . |

FOREIGN PATENT DOCUMENTS

| | | |
|---|---|---|
| 8907667 | 3/1990 | (DE) . |
| 0540549 | 2/1992 | (EP) . |
| 0599791 | 6/1994 | (EP) . |
| 60076323 | 4/1985 | (JP) . |
| 04190836 | 7/1992 | (JP) . |
| 9200137 | 1/1992 | (WO) . |
| 9322034 | 11/1993 | (WO) . |
| 9323153 | 11/1993 | (WO) . |
| 9830379 | 7/1998 | (WO) . |
| 0053294 | 9/2000 | (WO) . |

OTHER PUBLICATIONS

PCT International Search Report for PCT/US99/00638, published May 10, 1999.
PCT International Search Report for PCT/US99/00930, published May 11, 1999.
PCT International Search Report for PCT/US99/04851, published Jun. 18, 1999.
PCT International Search Report for PCT/US99/05626, published Jul. 19, 1999.
PCT International Search Report for PCT/US00/06181, published Jul. 5, 2000.

*Primary Examiner*—Ana Fortuna
*Assistant Examiner*—Richard W. Ward
(74) *Attorney, Agent, or Firm*—Cummings & Lockwood

(57) ABSTRACT

A process for making a reinforced, continuous, geometrically symmetrical microporous filtration membrane comprising a porous support material and a continuous microporous membrane having a middle region disposed between an upper region and a lower region, wherein said support material is embedded within said middle region and said middle region has a pore size at least about 50% greater than the pore size of at least one of said upper region and said lower region.

19 Claims, No Drawings

PROCESS OF MAKING A THREE-REGION REINFORCED MICROPOROUS FILTRATION MEMBRANE

RELATED APPLICATION

This application is related to commonly assigned U.S. provisional Patent Application Ser. No. 60/043,181, filed Apr. 11, 1997, of Meyering et al., the disclosure of which is herein incorporated by reference and is a divisional of U.S. patent application Ser. No. 09/035,388 filed Mar. 5, 1998, now abandoned, the disclosure of which is herein incorporated by reference.

FIELD OF THE INVENTION

This invention relates to reinforced microporous filtration membranes and to processes of making and using same.

BACKGROUND OF THE INVENTION

Microporous membranes are well known in the art. Microporous membranes are porous solids which contain microporous interconnecting passages that extend from one surface to the other. These passages provide tortuous tunnels through which the liquid which is being filtered must pass. The particles contained in the liquid passing through a microporous membrane become trapped on or in the membrane structure effecting filtration. A slight pressure, generally in the range of about 5 to 50 psig (pounds per square inch gauge) is used to force fluid through the microporous membrane. The particles in the liquid that are larger than the pores are either prevented from entering the membrane or are trapped within the membrane pores. The liquid and particles smaller than the pores of the membrane pass through. Thus, a microporous membrane prevents particles of a certain size from passing through it, while at the same time permitting liquid and particles smaller than that size to pass through. Microporous membranes have the ability to retain particles in the size range of from about 0.01 to about 10.0 microns.

Many important micron and submicron size particles can be separated using microporous membranes. For example, red blood cells are about 8 microns in diameter, platelets are about 2 microns in diameter and bacteria and yeasts are about 0.5 microns or smaller in diameter. It is possible to remove bacteria from water by passing the water through a microporous membrane having a pore size smaller than the bacteria. Similarly, a microporous membrane can remove invisible suspended particles from water used in the manufacture of integrated circuits in the electronics industry. Microporous membranes are characterized by bubble point tests, which involve measuring the pressure to force either the first air bubble out all over the membrane (foam-all-over-point or "FAOP"). The procedures for conducting initial bubble point and FAOP tests are well known in the art. The procedures for these tests are explained in detail for example in ASTM F316-70 and ANS/ASTM F316-70 (Reapproved 1976) which are incorporated herein by reference. The bubble point values for microporous membranes are generally in the range of about 5 to about 100 psig, depending on the pore size.

U.S. Pat. No. 3,876,738 describes a process for preparing microporous membranes by quenching a solution of a film-forming polymer in a non-solvent system for the polymer. U.S. Pat. No. 4,340,479 generally describes the preparation of skinless microporous polyamide membranes by casting a polyamide resin solution onto a substrate and quenching the resulting thin film of polyamide.

Since the mechanical strength of some microporous membranes is poor, it is known to reinforce such membranes with a porous support material to improve mechanical properties and facilitate handling and processing. Accordingly, the aforementioned U.S. Pat. No. 4,340,479 describes a procedure wherein polymer solution is directly cast onto a porous support material so that the polymer solution penetrates the support material during casting and becomes firmly adhered thereto during formation of the composite microporous membrane. The support material preferably possesses an open structure so that pressure drop across the composite membrane is minimized. U.S. Pat. No. 4,340,479 further discloses combining two microporous membranes, one of which may be reinforced, to form a dual layered structure which is dried under conditions of restraint to produce a single sheet having particle removal characteristics superior to those of individual layers.

U.S. Pat. No. 4,707,265 discloses a reinforced laminated filtration membrane comprising a porous reinforcing web impregnated with a polymeric microporous inner membrane and at least one polymeric microporous outer qualifying membrane laminated to each side of the impregnated web. The pore size of the inner membrane is greater than the pore size of the outer membranes. In this manner, the imperfections, e.g., fiber bundles, broken fibers, void areas, and the like, which are invariably present in the reinforcing web are confined to a coarse, more open inner membrane and the tighter outer qualifying layers are strengthened and supported by the web. The qualifying layers are not affected by imperfections present within the reinforcing web. Further, the use of a coarse, large pore size inner membrane layer insures that there is no substantial pressure drop of fluid across the reinforcing web.

The membranes disclosed in U.S. Pat. No. 4,707,265 are complicated and costly to produce since three separate operations are required to produce the composite membrane: first, the impregnated reinforced membrane support layer is produced, second, the non-reinforced qualifying layers are produced and, third, the impregnated reinforced membrane support layer and the non-reinforced qualifying layers are laminated to form the multilayer composite microporous membrane.

Due to processing and handling restraints, there is a limit to how thin the impregnated reinforced membrane support layer and the non-reinforced qualifying layers can be. As a result, the multilayer composite microporous membrane of U.S. Pat. No. 4,707,265 is at least about 10 mils thick. Furthermore, the overall pore size of the composite membrane described in U.S. Pat. No. 4,707,265 is generally limited to the range of approximately 0.45 microns or higher due to the difficulties of producing and handling non-reinforced qualifying layers having pore sizes of as low as 0.45 micron. Thus, the utility of the composite membrane is limited to nonsterilizing applications and other applications where membranes having 0.65, 0.8, 1.2, 3.0 and greater micron ratings are acceptable.

As the thickness of a membrane increases, pressure drop increases, flow rate worsens and the performance characteristics of the membrane are adversely affected. For example, with increasing thickness the total number of pleats in a pleated cartridge element decreases, thereby reducing the effective surface area available for filtration. Furthermore, a mechanical strain exists at the crest of each pleat and increases with increasing thickness. As a result, thick membranes are more likely to crack during the pleating, edge-seaming, etc. operations that are attendant to the production of pleated filter cartridge elements or during oxidative hydrolytic exposure or multiple steam cycling. Therefore, mechanical strains, which can never be fully relieved after cartridge fabrication, decrease the useful life of the product and lead to early failure in integrity.

U.S. Pat. No. 4,770,777 overcomes some of the shortcomings of the process disclosed in U.S. Pat. No. 4,707,265 by completely impregnating the reinforcing web with a large pore size (coarser) membrane casting solution, applying a small pore size membrane casting solution to one side of the coated web and then simultaneously quenching the large and small pore size casting solutions to provide a continuous, geometrically asymmetric membrane possessing a pore size gradient. Thus, the lamination step of U.S. Pat. No. 4,707,265 is eliminated, along with the necessity of handling the fragile non-reinforced qualifying layers. However, the membrane produced in U.S. Pat. No. 4,770,777 is skinned. Accordingly, the membrane suffers from drawbacks associated with skinned microporous membranes, in particular, high pressure drop, poor structural integrity, susceptibility to skin breach, propensity to becoming fouled by debris, etc.

U.S. Pat. No. 5,433,859 attempts to address some of the deficiencies, in particular, high pressure drop, of the skinned membrane disclosed in U.S. Pat. No. 4,770,777 by proposing an incomplete impregnation of the reinforcing web with coarse membrane casting solution so that a portion of the reinforcing web having a thickness of about 50 microns is not embedded within the continuous microporous membrane. The low flow resistance of that portion of the reinforcing web which is not embedded within the microporous membrane ensures that filtered fluid passing through the supported microporous membrane will not have a significant adverse impact on the pressure drop across the filtration element.

While the membrane disclosed in U.S. Pat. No. 5,433,859 exhibits lower pressure drop across the membrane compared to the skinned membrane disclosed in U.S. Pat. No. 4,770,777, the membrane does have significant structural drawbacks. First, the membrane suffers from tremendous geometric asymmetry around the central axis of the reinforcing web, i.e., the thickness of the membrane varies on each side of the reinforcing web. As a result, when the membrane is pleated, the mechanical strain on the thick side of the membrane is greater than on the thin side of the membrane. This differential in mechanical strain increases the possibility of stress crack formation and failure of the integrity of the membrane Second, the membrane poses a high risk of delamination along the membrane-reinforcing web interface, especially during backwashing operations. Third, the membrane can only be used with the open pore side of the membrane facing upstream, i.e., the membrane exhibits "sidedness".

SUMMARY OF THE INVENTION

It is an object of the present invention to provide a reinforced continuous microporous membrane possessing structural integrity.

It is another object of the present invention to provide a reinforced continuous microporous membrane exhibiting low pressure drop and high flow rate across the membrane.

It is a further object of the present invention to provide a reinforced continuous microporous membrane which is particularly suitable for the filtration of biological or parenteral fluids.

It is yet a further object of the present invention to provide a reinforced continuous microporous membrane which is particularly suitable for the filtration of high purity water for the electronics industry.

Yet another object of the present invention is to provide a method for fabricating such a reinforced continuous microporous membrane.

In accordance with these and further objects of the present invention, a reinforced, continuous, geometrically symmetrical microporous filtration membrane is provided which comprises a porous non-woven fibrous support material and a continuous microporous membrane having a middle region disposed between an upper region and a lower region, wherein said support material is embedded within said middle region and said middle region has a pore size at least about 50% greater than the pore size of at least one of said upper region and said lower region. The upper region and lower region possess substantially the same thickness, namely, the individual thickness of each region is on the order of about 25 microns. The pore size of the upper region and lower region can be the same or different.

The present invention further provides a method of fabricating a supported microporous filtration membrane which comprises providing a porous non-woven support material having first and second sides, impregnating said support material with a first casting solution, applying a second casting solution over said first side of said impregnated support material, applying a third casting solution over said second side of said impregnated support material, and forming a continuous microporous membrane having a middle region disposed between an upper region and a lower region from the first, second and third casting solutions such that said support material is embedded within said middle region and said middle region has a pore size at least about 50% greater than the pore size of at least one of said upper region and said lower region.

DESCRIPTION OF THE PREFERRED EMBODIMENTS

The reinforced, continuous, geometrically symmetrical, microporous filtration membrane of this invention comprises a porous support material and a continuous microporous membrane having a middle region disposed between an upper region and a lower region, wherein said support material is embedded within said middle region and said middle region has a pore size at least about 50% greater than the pore size of at least one of said upper region and said lower region.

The reinforced, continuous, geometrically symmetrical, microporous filtration membrane of this invention is produced from an organic polymeric microporous membrane. Use of the term "microporous membrane" herein is intended to encompass microporous membranes having the ability to retain particles in the size range of from about 0.01 to about 10.0 microns and higher.

The term "continuous" as applied to the microporous membrane of this invention shall be understood to refer to a microporous membrane wherein a continuum exists between regions of the membrane and no break exists between the polymer structure which comprises the middle region and that which comprises the upper region and the lower region of the membrane.

The phrase "geometric symmetry" utilized herein shall be understood to refer to a structure wherein the upper and lower regions of the microporous membrane possess substantially the same thickness. By "substantially the same thickness," it is meant that the thickness of the upper region can differ from the thickness of the lower region, and vice versa, by not more than about 25 percent. It is important to contrast the way the term "symmetry" is employed herein to the way the term "symmetry" is employed in U.S. Pat. No. 4,707,265. In that patent, symmetry refers to pore size symmetry; thus, in U.S. Pat. No. 4,707,265 the term applies when the outer qualifying layers possess substantially the same pore size. Pore size symmetry is a highly preferred, but not essential, characteristic of the present inventive microporous membrane.

Preferably, the microporous membrane is hydrophilic. By the use of the term "hydrophilic" in describing the membrane, it is meant a membrane which adsorbs or absorbs water. Generally, such hydrophilicity is produced by a sufficient amount of hydroxyl (OH—), carboxyl (—COOH), amino (—NH$_2$) and/or similar functional groups on the surface of the membrane. Such groups assist in the adsorption and/or absorption of water onto the membrane. Such hydrophilicity is particularly useful in the filtration of aqueous fluids.

Preferred microporous membranes are those produced from nylon. The term "nylon" is intended to embrace film forming polyamide resins including copolymers and terpolymers which include the recurring amido grouping and blends of different polyamide resins. Preferably, the nylon is a hydrolytically stable nylon possessing at least about 0.9 moles of amino end groups per mole of nylon as described in U.S. Pat. No. 5,458,782, the contents of which are incorporated by reference herein.

While in general the various nylon or polyamide resins are all copolymers of a diamine and a dicarboxylic acid, or homopolymers of a lactam and an amino acid, they vary widely in crystallinity or solid structure, melting point, and other physical properties. Preferred nylons for use in this invention are copolymers of hexamethylene diamine and adipic acid (nylon 66), copolymers of hexmethylene diamine and sebacic acid (nylon 610), homopolymers of polycaprolactam (nylon 6). and copolymers of tetramethylenediamine and adipic acid (nylon 46). These preferred polyamide resins have a ratio of methylene (CH$_2$) to amide (NHCO) groups within the range of about 4:1 to about 8:1, most preferably about 5:1 to about 7:1. The nylon polymers are available in a wide variety of grades, which vary appreciably with respect to molecular weight, within the range from about 15,000 to about 42,000 (number average molecular weight) and in other characteristics.

The highly preferred species of the units composing the polymer chain is polyhexamethylene adipamide, i.e. nylon 66, having molecular weights above about 30,000. Polymers free of additives are generally preferred, but the addition of antioxidants, surface active agents, charge modifying agents or similar additives may have benefit under some conditions.

The reinforced, continuous, geometrically symmetrical microporous membrane of this invention has, as an essential component thereof, a porous support material embedded within the middle region of said membrane. The porous support material may be prepared from any suitable material in any suitable manner. The support material should provide the membrane with sufficient strength to withstand the flow pressures encountered during use without deforming to the extent that the microporous membrane is damaged. The support material which can be employed herein includes woven materials in a grid or mesh-like configuration as well as nonwoven materials formed by extrusion, lamination, and the like. The support material preferably comprises polyester, polypropylene, polyethylene, polyamide and polyvinylidene fluoride. The support material used in conjunction with the present invention is preferably formed from fibers with as large a diameter as possible so as to provide a high degree of structural integrity and low pressure drop, while not so large that subsequent mechanical manipulations of such fibers may cause damage to the microporous membrane. Most preferably, the support material will utilize fibers of about 20–25 microns in diameter to provide an average pore size of about 50–100 microns in diameter.

The middle region of the microporous membrane should have an average pore size which is at least about 50% greater, preferably at least about 100% greater, more preferably at least about 200% greater, than the average pore size of at least one of the upper region and lower region of the membrane, preferably both. The pores in the middle region will generally have an average size of about 10 microns or less and the average pore size will preferably range from about 0.5 microns to about 2 microns, more preferably from about 0.1 to about 1.0 microns. The pore size distribution of the middle region is preferably quite narrow, although this is not essential for satisfactory performance. The middle region should be as thin as possible so long as it provides the desired structural strength and embeds the support material such that no fibers of the support material protrude through the middle region and into the upper or lower regions. The thickness of the middle region will typically range from about 50 microns to about 150 microns and preferably from about 75 microns to about 100 microns.

The upper and lower regions of the microporous membrane possess pores which have a size providing the desired filtration efficiency or particle removal. Generally, the average size of the pores of the upper region and the lower region will be about 1 micron or less, and can typically range from about 0.01 microns to about 1 microns. More preferably, the average size of the pores of each region will range from about 0.2 microns to about 0.5 microns. The pore size distribution of the upper and lower regions of the microporous membrane is preferably narrow. In a particularly preferred embodiment, the average pore size of the upper region is substantially the same as the average pore size of the lower region. By "substantially the same", it is meant that the average pore size of the upper region does not differ from that of the lower region, and vice versa, by more than about 25 percent.

A critical feature of the reinforced microporous membrane of this invention is that the upper and lower regions possess substantially the same thickness so as to provide geometric symmetry around the central axis of the membrane.

These regions should be as thin as possible in order to minimize the pressure drop across the microporous membrane while being sufficiently thick to yield desired particulate removal. The individual thickness of each of the upper and lower regions will generally range from about 25 microns to about 150 microns, preferably from about 35 microns to about 60 microns. The overall thickness of the reinforced, continuous, geometrically symmetrical microporous filtration membrane of this invention will generally not exceed about 10 mils.

The geometric symmetry of the present inventive microporous membrane minimizes mechanical strains, reduces the likelihood of delamination of the membrane and generally improves the structural integrity of the membrane.

The reinforced microporous membrane may be rolled and stored for use under ambient conditions. It will be understood that the reinforced microporous membrane may be formed into any of the usual commercial forms, for example, discs or pleated cartridges.

For sterile filtrations involving biological liquids, the reinforced microporous membrane is sanitized or sterilized by autoclaving or hot water flushing. The reinforced microporous membrane of this invention is resistant to this type treatment, particularly when a hydrolytically stable nylon is used as described hereinabove, and retains its integrity in use under such conditions.

The reinforced microporous membrane is easy to handle and readily formed into convoluted structures, e.g. pleated configurations. By reason of its retained flow characteristics it may be employed directly in existing installations, without pumping modifications.

After formation of the reinforced microporous membrane of this invention it may be treated in accordance with U.S. Pat. No. 4,473,474 to produce a cationically charge modified microporous membrane particularly suitable for the filtration of parenteral or biological liquid or in accordance with U.S. Pat. No. 4,473,475 to produce cationically charge modified microporous membrane particularly suitable for the filtration of high purity water required in the manufacture of electronic components. The entire disclosures of both these patents are incorporated herein by reference.

The reinforced filtration membrane of this invention is characterized by unexpectedly high flow rates for a given differential pressure and also characterized by durability, strength, uniformity, lack of pinholes and bubble defects. The preferred membranes may be used with either side of the membrane facing upstream.

The present invention further provides a method of preparing a einforced, continuous, geometrically symmetrical microporous filtration membrane. The method comprises providing a porous support material having first and second sides, impregnating said support material with a first casting solution, applying a second casting solution over said first side of said impregnated support material, applying a third casting solution over said second side of said impregnated support material and thereafter forming a continuous microporous membrane having a middle region disposed between an upper region and a lower region from the first, second and third casting solutions such that said support material is embedded within said middle region and said middle region has a pore size at least about 50% greater than the pore size of at least one of said upper region and said lower region.

The casting solutions, quench baths and general membraneforming procedures utilized to fabricate the reinforced microporous membrane herein are conventional in nature. The microporous membrane of this invention is generally produced by casting or extruding a plurality of casting solutions containing film-forming polymer in a solvent system and simultaneously quenching the casting solutions simultaneously in a bath comprised of a nonsolvent system for the polymer. The most important parameter responsible for development of micropores in the membrane (e.g. pore size) is the solvent system employed with the polymer and the nonsolvent system used in quenching the film. The selection of the solvent for the polymer is determined by the nature of the polymer material used and can be empirically determined on the basis of solubility parameters as is well known and conventional in the art.

The casting solutions for forming the preferred nylon microporous membrane of this invention contain nylon polymer in a solvent system for the polymer. The solvent system comprises a mixture of at least one solvent and one nonsolvent for the polymer. The solvents which can be used with alcohol soluble nylons include lower alkanols, e.g. methanol, ethanol and butanol, and mixtures thereof. It is known that nonalcohol soluble nylons will dissolve in solvents of acids, for example, formic acid, citric acid, acetic acid, maleic acid, and similar acids. The nylon casting solutions after formation are diluted with a nonsolvent for the nylon which is miscible with the nylon solution. Dilution with nonsolvent may be effected up to the point of incipient precipitation of the nylon. The nonsolvents are selected on the basis of the nylon solvent utilized. For example, when water miscible nylon solvents are employed, water can be the nonsolvent. Generally, the nonsolvent can be water, methyl formate, aqueous lower alcohols, such as methanol and ethanol, polyols such as glycerol, glycols, polyglycols, and ethers and esters thereof and mixtures of any of the foregoing.

The support material having first and second sides will be impregnated with first casting solution by any of a variety of techniques, e.g., roll coating, spray coating, slot die coating, and the like, to completely impregnate the support with first casting solution. The support is preferably maintained under tension while the first casting solution penetrates and saturates the support. The coated support can be calendered, if desired, by rollers to force the first casting solution into the support as described in U.S. Pat. No. 4,707,265, the contents of which are incorporated by reference herein. Thereafter, the second casting solution will be applied over the first side of the impregnated support material and the third casting solution will be applied over the second side of the impregnated support material employing any suitable technique, e.g., roll coating, spray coating, slot die coating, and the like. Application of the second and third casting solutions is preferably simultaneous. Slot dies to which casting solution is fed under pressure have been found to provide particularly good results in applying the second and third casting solutions. Preferably, the slot dies are disposed directly opposite one another with the impregnated support passing there between. The second and third casting solutions are applied over each side in substantially equal amounts. In accordance with a preferred embodiment, the second and third casting solutions are identical in composition. Thereafter, the first, second and third casting solutions are quenched simultaneously in the same quench bath. Since the first casting solution is more coarse, it will coagulate more slowly, allowing for the formation of a continuous microporous membrane having an open-pore size middle region disposed between tighter pore size upper region and lower region. After the microporous membrane is thus formed, the membrane is washed and dried to provide the final product.

The method can be conducted in a continuous or batchwise manner. In a continuous method, support material, e.g., in the form of a nonwoven fibrous web, is unwound under tension from a roll and impregnated with first casting solution as described above. The impregnated support material is then contacted on each side with second and third casting solutions as previously described. The thus coated material is then immersed while still under tension in a quench bath to form a microporous membrane from the first, second and third casting solutions. The microporous membrane is then dried and wound under tension on a roll for storage.

What is claimed is:

1. A method of fabricating a reinforced, continuous, geometrically symmetrical microporous filtration membrane which comprises:

providing a porous support material having first and second sides;

impregnating said support material with a first casting solution;

applying a second casting solution over said first side of said impregnated support material;

substantially simultaneously with the application of the second casting solution, applying a third casting solution over said second side of said impregnated support material;

quenching the porous support material having the casting solutions applied thereto to form a continuous microporous membrane having a middle region disposed between an upper region and a lower region from the first, second and third casting solutions such that said support material is embedded within said middle region and said middle region has a pore size at least about 50% greater than the pore size of at least one of said upper region and said lower region.

2. The method of claim 1 wherein the casting solutions comprise nylon polymer in a solvent system for the polymer.

3. The method of claim 2 wherein the solvent system comprises a mixture of at least one solvent and one nonsolvent for the polymer.

4. The method of claim 3 wherein solvent system further comprises a member of the group consisting of lower alkanols, methanol, ethanol and butanol, and mixtures thereof.

5. The method of claim 3 wherein solvent system further comprises a member of the group consisting of formic acid, citric acid, acetic acid, and maleic acid.

6. The method of claim 3 wherein casting solutions after formation are diluted with a nonsolvent for the nylon which is miscible with the nylon solution.

7. The method of claim 6 wherein dilution with nonsolvent may be effected up to the point of incipient precipitation of the nylon.

8. The method of claim 3 wherein the nonsolvents are selected on the basis of the nylon solvent utilized.

9. The method of claim 3 wherein the nonsolvent is selected from the group consisting of water, methyl formate, aqueous lower alcohols, polyols such as glycerol, glycols, polyglycols, ethers and esters thereof, and mixtures of any of the foregoing.

10. The method of claim 3 wherein the support material is maintained under tension while the first casting solution penetrates and saturates the support.

11. The method of claim 1 further comprises the step of calendering to force the first casting solution into the support material.

12. The method of claim 11 wherein the second casting solution is applied over the first side of the impregnated support material and the third casting solution is applied over the second side of the impregnated support material by employing slot die coating.

13. The method of claim 12, wherein application of the second and third casting solutions is simultaneous.

14. The method of claim 12 wherein the casting solution is fed under pressure to the slot dies.

15. The method of claim 12, wherein the slot dies are disposed directly opposite one another with the impregnated support passing therebetween.

16. The method of claim 12, wherein during the applying steps, the second and third casting solutions are applied over each side in substantially equal amounts.

17. The method of claim 12 wherein, the first, second and third casting solutions are quenched simultaneously in the same quench bath.

18. The method of claim 12 further comprising the steps of:

washing the quenched membrane; and drying the washed membrane to provide a final membrane product.

19. The method of claim 10 further comprising the steps of:

drying the membrane; and winding the membrane under tension on a roll for storage.

* * * * *